(12) United States Patent
Baker et al.

(10) Patent No.: US 9,004,624 B2
(45) Date of Patent: Apr. 14, 2015

(54) PRINTING ON A ROTATING SURFACE

(75) Inventors: Richard J. Baker, West Lebanon, NH (US); Edward T. Chrusciel, Nashua, NH (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 475 days.

(21) Appl. No.: 13/112,304

(22) Filed: May 20, 2011

(65) Prior Publication Data

US 2011/0316922 A1 Dec. 29, 2011

Related U.S. Application Data

(63) Continuation of application No. 11/871,597, filed on Oct. 12, 2007, now Pat. No. 7,946,668.

(60) Provisional application No. 60/829,496, filed on Oct. 13, 2006.

(51) Int. Cl.

| B41J 29/38 | (2006.01) |
|---|---|
| B41J 29/00 | (2006.01) |
| B41J 3/28 | (2006.01) |
| B41J 3/407 | (2006.01) |
| B41J 11/00 | (2006.01) |
| G06K 15/02 | (2006.01) |
| G06K 15/10 | (2006.01) |

(52) U.S. Cl.
CPC .. B41J 29/00 (2013.01); B41J 3/28 (2013.01); B41J 3/4071 (2013.01); B41J 11/008 (2013.01); G06K 15/02 (2013.01); G06K 15/102 (2013.01); G06K 2215/0082 (2013.01)

(58) Field of Classification Search
USPC ......... 347/4, 8, 16, 1–2, 5, 9; 358/1.9; 400/56
See application file for complete search history.

(56) References Cited

U.S. PATENT DOCUMENTS

| 4,066,268 A | 1/1978 | Borchard et al. |
| 5,173,988 A | 12/1992 | Bhatia et al. |
| 5,317,337 A | 5/1994 | Ewaldt |
| 5,613,790 A | 3/1997 | Miazga |
| 5,730,048 A | 3/1998 | Averill et al. |
| 5,784,171 A | 7/1998 | Kano |
| 5,865,114 A | 2/1999 | Averill et al. |
| 6,053,101 A | 4/2000 | Hix |
| 6,074,031 A | 6/2000 | Kahle |
| 6,264,295 B1 | 7/2001 | Bradshaw et al. |

(Continued)

FOREIGN PATENT DOCUMENTS

| CN | 1177184 | 3/1998 |
| JP | H8-207264 A | 8/1996 |

(Continued)

OTHER PUBLICATIONS

Chinese Office Action; Jun. 2, 2010; China; 200780038235.8; 12 pages.

(Continued)

Primary Examiner — Lam Nguyen
(74) Attorney, Agent, or Firm — Fish & Richardson P.C.

(57) ABSTRACT

In some examples, a printing system including a rotating platen having an axis of rotation and configured to support a substrate, and a printhead configured to eject drops in a direction parallel with the axis of rotation onto the substrate supported by the rotating platen.

25 Claims, 6 Drawing Sheets

(56) References Cited

U.S. PATENT DOCUMENTS

| | | |
|---|---|---|
| 6,382,098 B2 | 5/2002 | Inoue et al. |
| 6,397,740 B1 | 6/2002 | Dubuit |
| 6,408,745 B1 | 6/2002 | Topolewski et al. |
| 6,538,767 B1 | 3/2003 | Over et al. |
| 6,767,148 B2 | 7/2004 | Murata |
| 6,769,357 B1 | 8/2004 | Finan |
| 6,854,841 B1 | 2/2005 | Unter |
| 6,871,946 B2 | 3/2005 | Yanagi et al. |
| 6,902,248 B2 | 6/2005 | Koguchi |
| 6,910,750 B2 | 6/2005 | Jones et al. |
| 6,986,559 B1 | 1/2006 | Youngberg et al. |
| 7,290,949 B1 * | 11/2007 | Phillips et al. ............ 400/56 |
| 7,424,851 B2 | 9/2008 | Landesman et al. |
| 7,436,421 B2 | 10/2008 | Lipinski |
| 7,446,792 B2 | 11/2008 | Yamada et al. |
| 7,484,820 B2 | 2/2009 | Sugahara |
| 7,497,534 B2 | 3/2009 | Struk et al. |
| 2002/0097280 A1 | 7/2002 | Loper et al. |
| 2002/0109738 A1 | 8/2002 | Ozawa |
| 2003/0010229 A1 | 1/2003 | Fujita et al. |
| 2004/0257601 A1 * | 12/2004 | Tomiyasu et al. ............ 358/1.9 |
| 2005/0117947 A1 | 6/2005 | Shiaku |
| 2006/0209102 A1 | 9/2006 | Jones et al. |
| 2006/0221780 A1 | 10/2006 | Sugahara |
| 2009/0090257 A1 | 4/2009 | Feldman et al. |

FOREIGN PATENT DOCUMENTS

| | | |
|---|---|---|
| JP | H11-34305 A | 2/1999 |
| JP | 2005035692 A | 2/2005 |
| WO | WO9954141 A1 | 10/1999 |

OTHER PUBLICATIONS

European Office Action; May 27, 2011; European Patent Office (EPO); 07853991.3; 6 pages.

Japanese Office Action; Jun. 12, 2012; Japan; JP 2009-532598; 4 pages.

European Search Report issued in co-pending European Application No. 07853991.3, received Oct. 1, 2010, 3 pages.

International Search Report issued in counterpart International Application No. PCT/US2007/081216, mailed Jul. 3, 2008.

International Preliminary Report on Patentability issued in counterpart International Application No. PCT/US2007/081216, mailed Apr. 23, 2009, 7 pages.

Office Action issued in co-pending Chinese application No. 200780038238.5, dated Jun. 2, 2010, 12 pages.

U.S. Appl. No. 60/829,496, Baker, filed Oct. 13, 2006; Application, Pending Claims.

Engineering drawings of printer (Part No. SBR-ST-2224) manufactured by Dimatix, Inc. offered for sale in the United States more than a year before filing U.S. Appl. No. 60/829,496.

* cited by examiner

PRINTING ON A ROTATING SURFACE

CLAIM OF PRIORITY

This application is a continuation of and claims priority under 35 U.S.C. §120 to U.S. application Ser. No. 11/871,597, filed on Oct. 12, 2007, which claimed priority to U.S. Provisional Application No. 60/829,496, filed Oct. 13, 2006, the contents of both are hereby incorporated by reference.

BACKGROUND

Droplet ejection devices are used for depositing droplets on a substrate. Ink jet printers are a type of droplet ejection device. Ink jet printers typically include an ink supply to a nozzle path. The nozzle path terminates in a nozzle opening from which ink drops are ejected. Ink drop ejection is controlled by pressurizing ink in the ink path with an actuator, which may be, for example, a piezoelectric deflector, a thermal bubble jet generator, or an electro statically deflected element. A typical printhead has an array of ink paths with corresponding nozzle openings and associated actuators, such that drop ejection from each nozzle opening can be independently controlled. In a typical drop-on-demand printhead, each actuator is fired to selectively eject a drop at a specific pixel location of an image as the printhead and a printing substrate are moved relative to one another. In some high performance printheads, the nozzle openings typically have a diameter of 50 microns or less, e.g. around 35 microns, are separated at a pitch of 100-300 nozzle/inch, have a resolution of 100 to 3000 dpi or more, and provide drop sizes of about 1 to 70 picoliters or less. Drop ejection frequency can be 10 kHz or more.

SUMMARY

Generally, the invention relates to printing on moving surfaces. In an aspect, a printing system includes a platen that moves a substrate along a non-straight path (e.g., by the platen rotating about an axis of rotation) and configured to support a substrate, and a printhead configured to eject drops of an image on the substrate as it is moved along the non-straight path.

In another aspect, a printing system has a printhead for depositing droplets, a platen to support a substrate and rotate about an axis in a circular motion relative to the printhead, the printhead being positioned to deposit droplets in a direction parallel with the axis of rotation, and an imaging system to format image data to account for the circular motion of the substrate and to send instructions to the printhead to deposit droplets on the substrate based on the formatted image data.

Implementation may include one or more of the following features. The printhead can be an ink jet printhead. The printing system can have a plurality of printheads (e.g., four printheads, one for each ink color, cyan, magenta, yellow, and black). The system can include a printhead for depositing a coating on a surface of the substrate, or a curing station for curing the droplets on the substrate. The system can have a platen including a cavity for holding the substrate, a trigger that rises above a surface of the platen when the substrate is placed in the cavity. The system can include a key (e.g., barcode) on the platen and a reader that reads information (e.g., set-up parameters for the rotating platen) stored on the key, the reader sends the information to the imaging system. The platen can be made of a moldable material that conforms to a shape of the substrate, and the platen can support a plurality of substrates. The platen can be coupled to a conveyor that moves relative to the printhead. There can also be a plurality of platens coupled to the conveyor.

In an aspect, a method of printing includes rotating a substrate on a platen about an axis in a circular motion, formatting image data to account for the circular motion of the substrate, and using a printhead to deposit droplets in a direction parallel to the axis of rotation to print an image on the substrate based on the formatted image data.

Implementations can include one or more of the following features. Formatting the image data can include converting the image data into bitmap raster data, applying an arc process, applying a gradient mask process, or separating the image data into cyan, magenta, yellow, and black. The method can also include sending the formatted image data to the printhead, curing the droplets on the substrate, or sensing the substrate in the platen and causing the printhead to deposit droplets when the substrate is sensed. A key can store information about the platen, and the method can include reading the information on the key and sending the information to an imaging system. The method can also include storing image data in an imaging system. The image can be comprised of dots having a certain image resolution after one revolution, and the method can further include increasing the image resolution by moving the printhead relative to the platen and printing dots in a space between the dots after the first revolution.

Certain implementations may have one or more of the following advantages. Fewer printheads are needed to print higher resolution because the substrates can be rotated under the same printheads several times to increase the resolution. The platen can be used to print on a small number of substrates (e.g., customized products) or a less than full platen. The set-up time is minimal. The printing system can print on different substrates within the same platen. Rotating the substrates under the printheads can be faster than some conventional printing methods, especially for small items.

Further aspects, features, and advantages will become apparent from the following detailed description, the drawings, and the claims.

DETAILED DESCRIPTION

Figure 1:
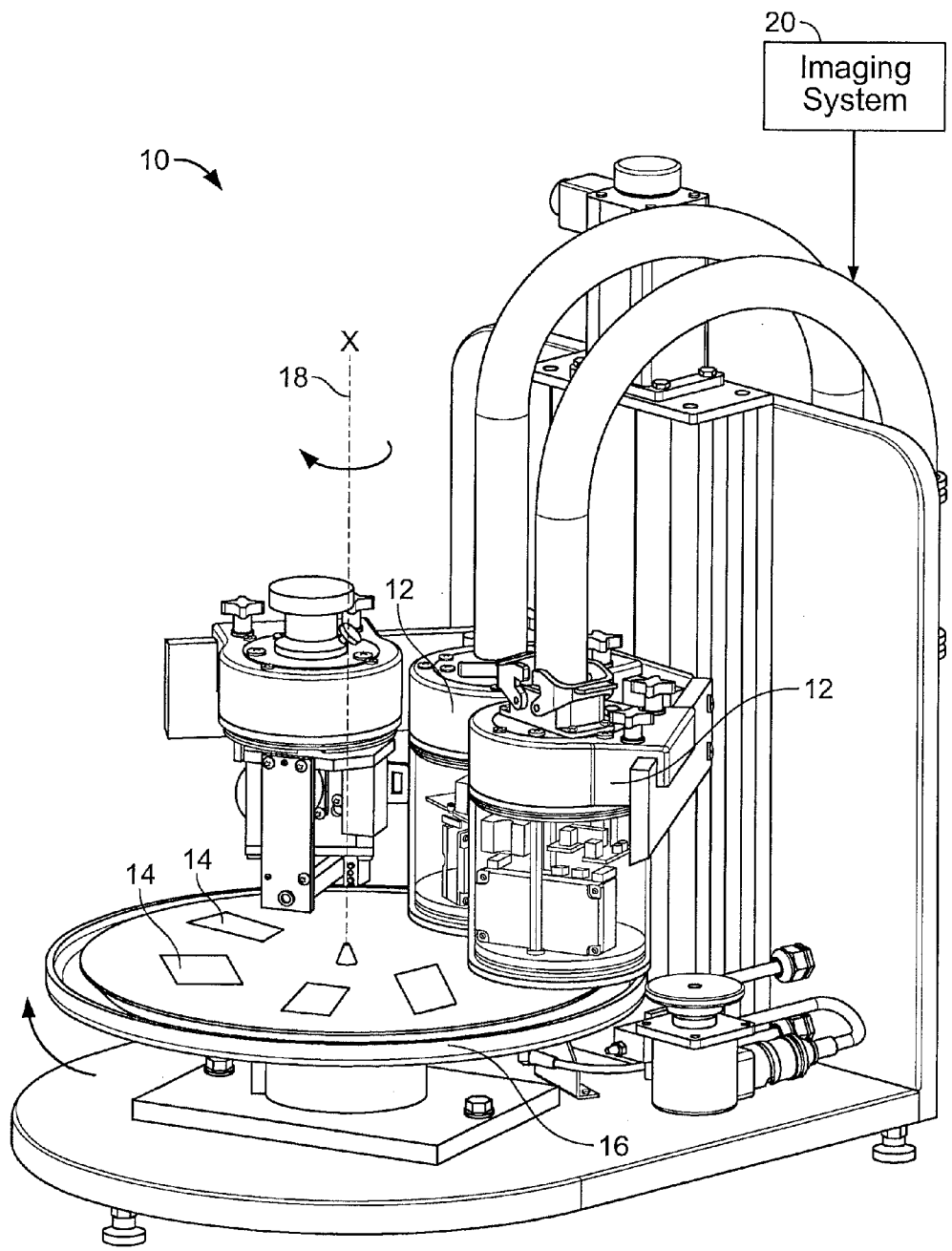
FIG. 1 depicts a perspective view of a printing system with a rotating platen.

FIG. 1 shows a printing system 10 including two printheads 12 (e.g., ink jet printheads) for depositing fluids (e.g., cyan, magenta, yellow, and black ink) onto a substrate 14 supported by a rotating platen 16. The platen in FIG. 1 shows a rotating platen 16 with an axis of rotation X 18. A substrate 14 is placed on the platen 16, the platen rotates about the axis X 18, and the printhead 12 prints on the substrate as the substrate passes under the printhead. The printhead prints images retrieved from an imaging system 20 e.g., a computer). The imaging system 20 can store, process, and send image data to the printhead 12. Processing image data can include dividing and translating the image data, such as converting the image data into a format compatible with the printer.

Unlike single-pass or scan printing, which operates in a linear motion, the printing system in FIG. 1 operates in a circular motion. The imaging system 20 uses software to format the image data to account for the circular movement of the substrate relative to the printhead.

Referring to FIG. 1, the platen 16 supports multiple substrates 14 to be printed. When the printhead 12 finishes printing on the substrates 14, the platen 16 can be removed and replaced with the next platen. This can be a manual or automated process.

Figure 2:
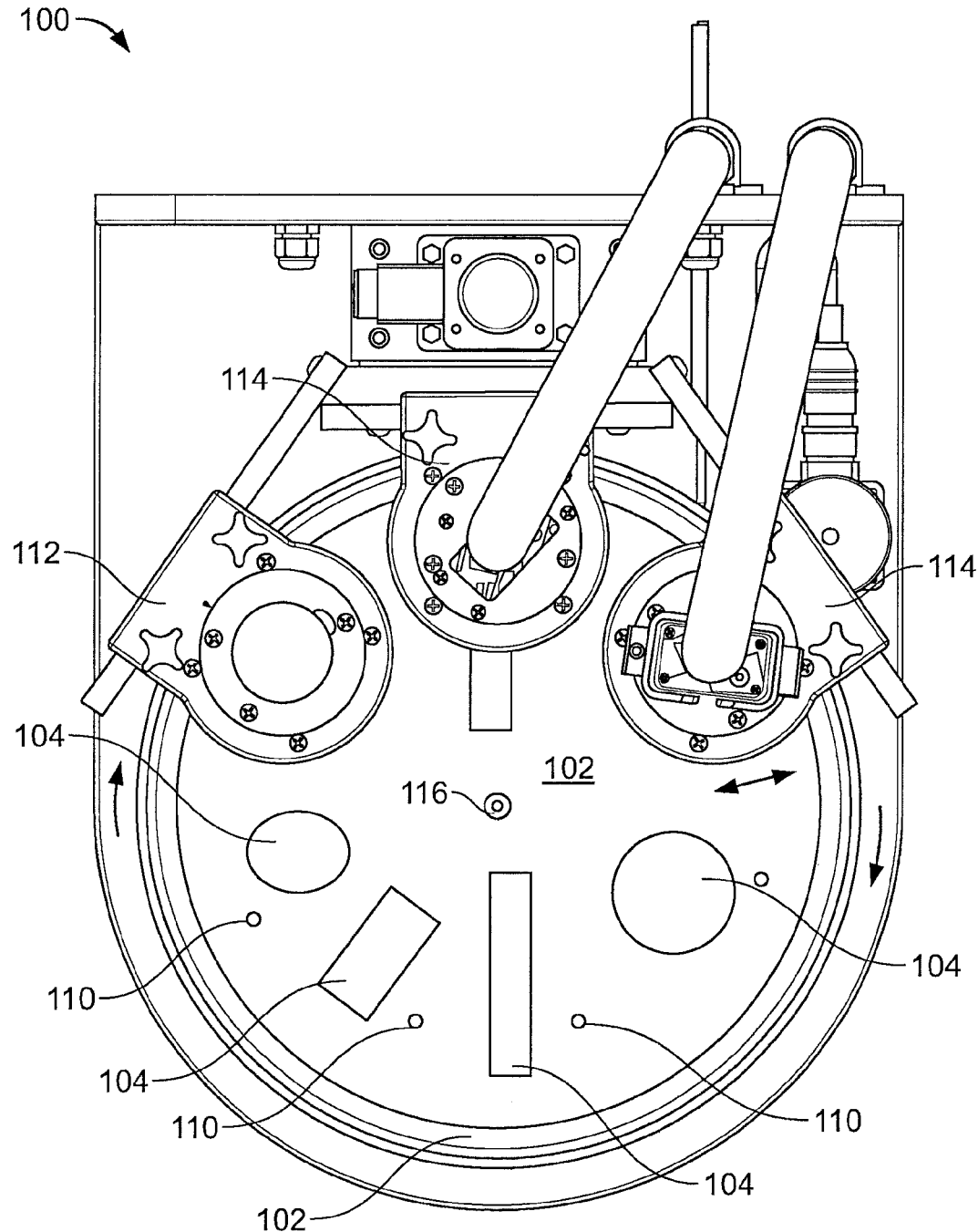
FIG. 2 depicts a top view of a printing system.

FIG. 2 shows a printing system 100 including a platen 102 made from a moldable material (e.g., thermoplastic material), such that the platen 102 conforms to the shape of the customized product and forms recessed cavities 104. The platen 102 can then hold the exact number of products to be printed. The platen can also be molded to hold different types of products within the same platen, such as lighters and pens.

Referring to FIG. 2, the platen includes a trigger 110 that rises above the surface of the platen 102 when a product is placed in a cavity 104. The printing system can have a trigger sensor 112 to detect a raised trigger and to communicate with the printhead 114 if there is a product in the cavity 104. This enables users to print less than a full platen.

Figure 3:
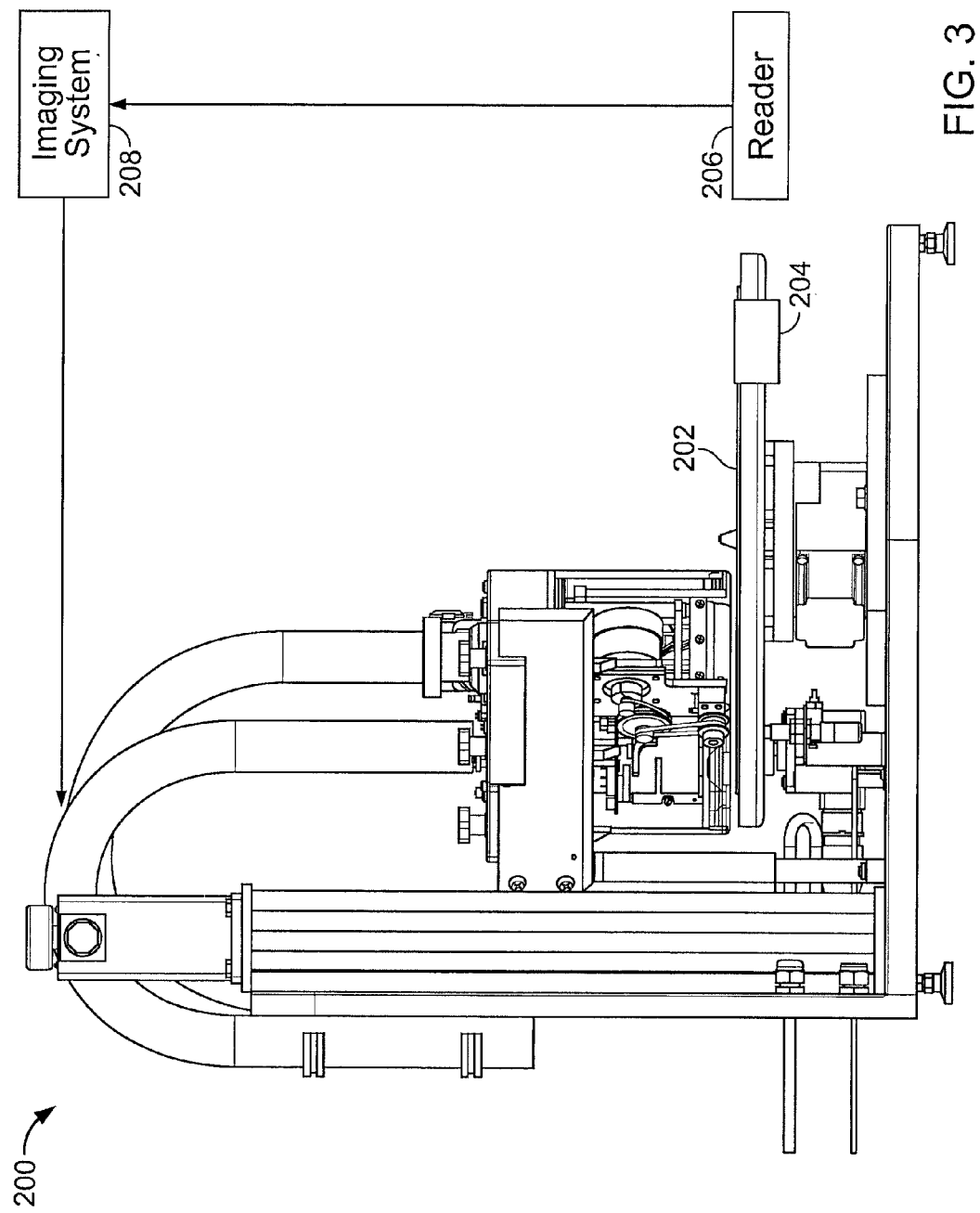
FIG. 3 depicts the printing system including a rotating platen with a key and a key reader.

Referring to FIG. 3, the printing system 200 includes a platen 202 with a key 204 (e.g., bar code, RFID tag) and a reader 206 to read the key 204 on the platen 202. The key 204 can provide information about the platen 202, such as the type of products on the platen 202 and set-up parameters (e.g., automatic adjustment of printhead stand-off distance). The reader 206 communicates with the imaging system 208, which instructs the printhead based on this information.

For example, a barcode on a platen can indicate that the platen holds coffee mugs. A barcode reader reads the barcode that the platen contains coffee mugs. The imaging system, in response, adjusts the printhead stand-off distance to a height that permits the mugs to pass under the printhead without damaging the head. The imaging system also processes the images to account for the circular motion of the mugs relative to the printhead.

Alternatively, a user can manually enter into the imaging system the type of products on the platen and select the images to be printed. The printhead can have a home position that is a predetermined vertical or horizontal distance from the platen. This enables users to easily transfer platens on and off the printing system.

Figure 5:
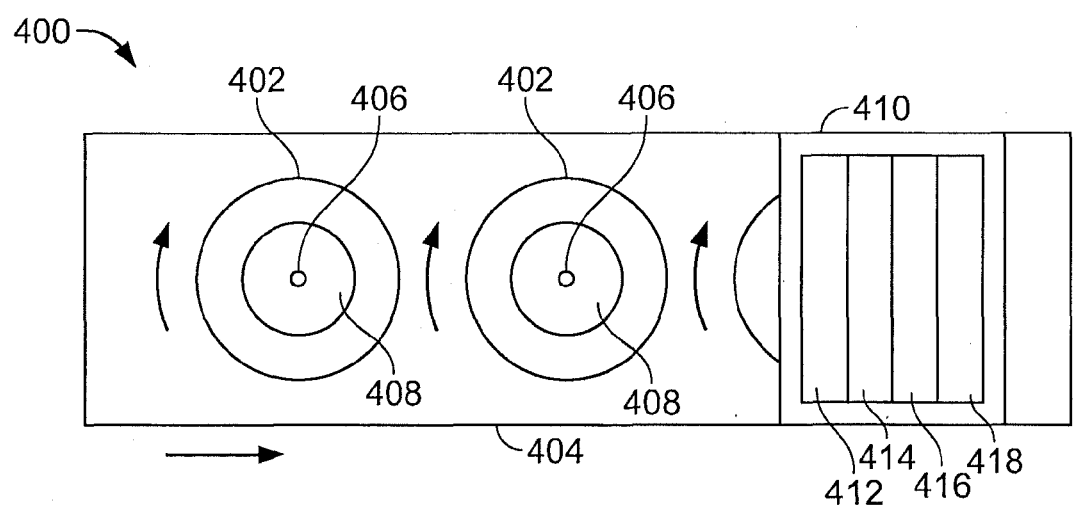
FIG. 5 depicts a top view of a printing system with rotating platens on a conveyor.

While the platen in FIG. 1 rotates about a stationary axis, a platen 402 could rotate about an axis that moves along a conveyor system 404, as shown in the printing system 400 of FIG. 5. A rotating peg 406 could be used in place of a platen. Multiple rotating pegs connected to a conveyor system spin objects 408, such as compact disc (CD) or digital video disc (DVD). The printhead 410 prints on the spinning compact discs as they travel linearly along the conveyor, similar to single pass printing. This can be faster than scanning printing, especially for small objects. The printhead can print a coating on the surface of the disc or print graphics on it. The printhead 410, in FIG. 5, includes four colors, cyan 412, magenta 414, yellow 416, and black 418.

Figure 4:
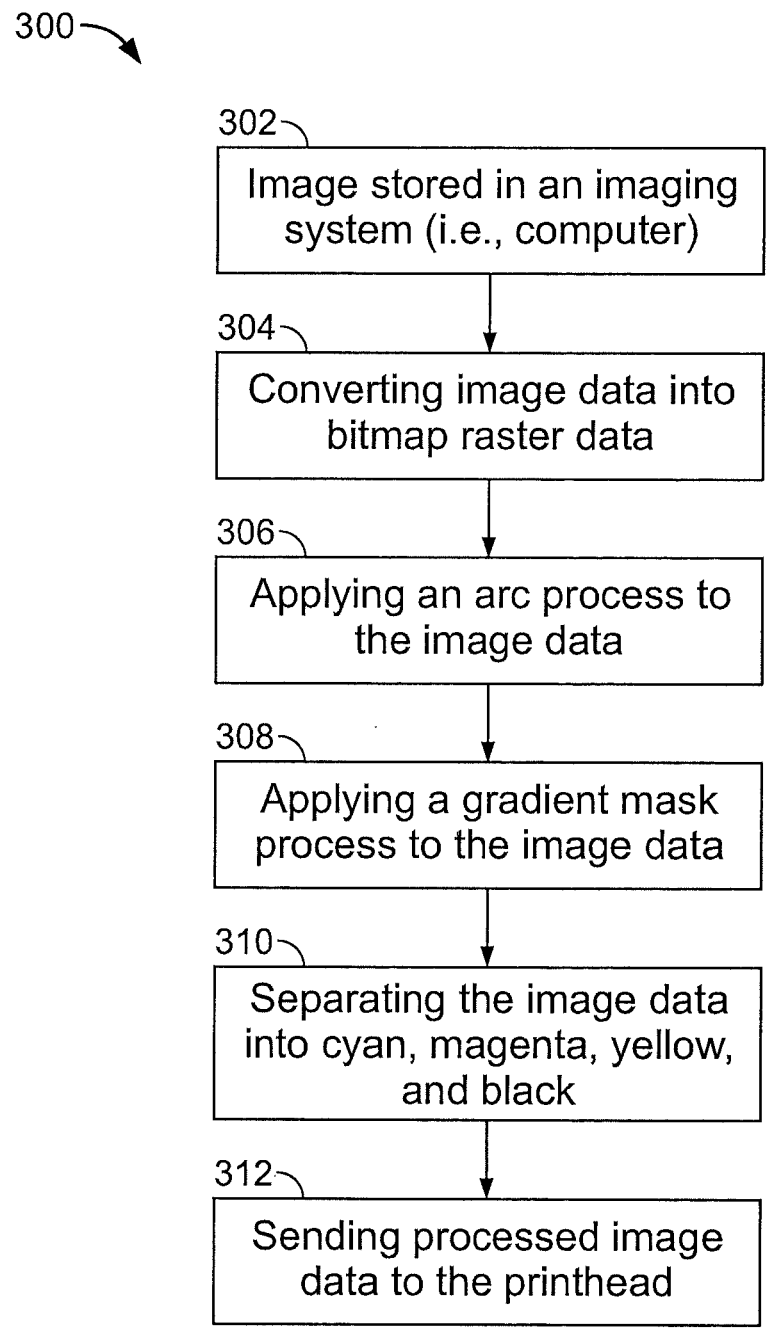
FIG. 4 is a flowchart of the image data processing before printing.

Referring to FIG. 4, the flowchart 300 shows how image data is processed so that the printhead can print data on a substrate supported by a rotating platen or peg. First, the image data is in a format stored by the imaging system 302 (e.g., graphic image format (gif), joint experts group (jpeg), PostScript, Printer Command Language (PCL), or other image data collection). Second, the imaging system uses software to convert the image data into a format compatible with the printhead 304, such as bitmap raster data. The image data goes through an arc process 306 and gradient mask process 308 to compensate for the circular motion of the substrate and the image resolution variation of a substrate from the center to the edge of the platen.

Figure 4A:
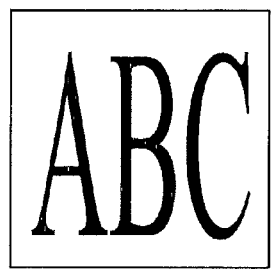
FIG. 4A depicts image data for printing on a substrate

The portion of the substrate closer to the edge of the platen moves faster than the portion of the substrate closer to the center. This causes errors in drop placement of the image data on a substrate. The drops placed near the center of the platen are closer together than the drops placed near the edge of the platen. To compensate for the circular motion, the image data 30 illustrated graphically in FIG. 4A ("ABC") goes through an arc process that bends the image data 30 to compensate for the faster and slower portions of the substrate and correct the drop placement.

Figure 4B:
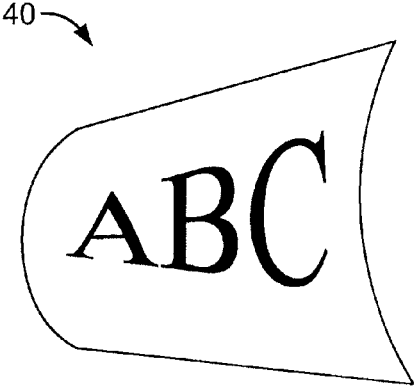
FIG. 4B depicts formatted image data after the arc process.

FIG. 4B graphically shows formatted image data 40 after going through the arc process. The "A" is closer to the edge of the platen, therefore its size is reduced to compensate for the platen moving faster near the edge, which spaces the dots further apart. On the other hand, the "C" is enlarged because it is closer to the center, which is moving slower causing the dots to land closer together.

Figure 4C:
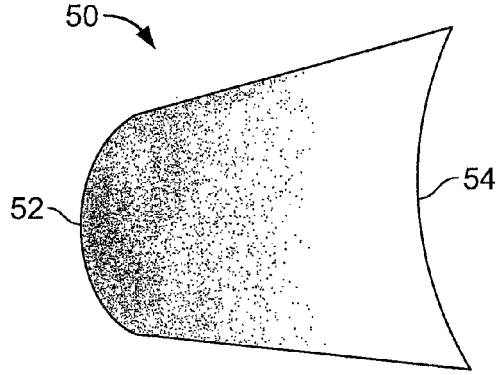
FIG. 4C depicts the variation of image boldness when printing on a rotating platen.
Figure 4D:
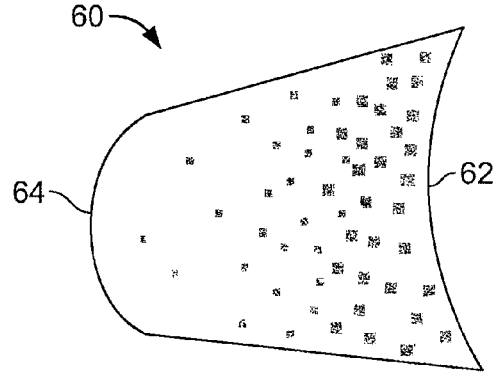
FIG. 4D depicts a random matrix of white dots for the gradient mask process.

The gradient mask process compensates for the variation of image boldness, in which the portion 52 of the image furthest from the center is lighter than the portion 54 closest to the center of the platen, as seen in FIG. 4C. The gradient mask process overlays a random matrix of white dots 60, shown in FIG. 4D, onto the image data with more white dots in the darker areas 62. The number of white dots decreases from the darker areas 62 to the lighter areas 64 to provide uniformity in the image boldness from the center to the edge of the platen.

The image data can be separated into cyan, magenta, yellow, and black 310, and sent to the printhead for printing 312. The sequence of steps described is an example of how the image data can be processed. These steps can be rearranged, some steps can be combined into a single step, or some steps can be added or eliminated.

With respect to the printing systems in FIGS. 1, 2 and 3, the printheads used can include NOVA JA 256 or GALAXY JA 256, which are commercially available from FUJIFILM Dimatix, Inc. located in Lebanon, N.H. The printheads can print images with a resolution of about 400 dpi to about 1200 dpi.

In FIGS. 1, 2 and 3, the substrates can be cell phones, edible items, compact discs, DVDs, specialty advertising products, such as lighters, golf balls, medallions, pens, letter openers, and any other objects. The objects can be customized for business or for personal use. The printheads can deposit ink (e.g., ultraviolet, solvent, aqueous, or hot melt ink), coatings, edible substances, plastic, or any other materials. The platen can be any shape, such as a circular, rectangular, or triangular. The platen can be mounted horizontally, vertically, or any other desired orientation, and can rotate around a center axis or an off-centered axis.

The printing system in FIGS. 1 and 2 shows two printheads, but the printing system can have any number of printheads or only one printhead. The printing system can include a printhead for depositing a coating on a substrate, such as a varnish top coat. The imaging system shown in FIG. 1 can support text, line art, logotypes, and graphics.

The printing system of FIGS. 1, 2 and 3 can also include a curing station, such as an ultraviolet curing station. The term "peg" is not limited to a particular shape or size. For example, the peg can be round or square. The peg can have more than one prong. While FIGS. 1, 2 and 3 shows platens and pegs to support objects, other implementations can be used to support and rotate objects relative to a printhead. Alternatively, the platens or pegs in FIGS. 1, 2 and 3 could be stationary while the printheads rotate relative to the substrates.

Referring to FIG. 2, the trigger can be a mechanical trigger (e.g., knob), optical trigger (e.g., laser beam), an electrical trigger, or any other type of trigger.

The printing system 100 of FIG. 2 can print images having a certain image resolution that correlates with the nozzle pitch of the printheads 114. The image resolution can be increased by increasing the number of dots per inch with each revolution of the platen. For example, when the substrates pass under the head one time, the heads print an image having 100 dpi. After the first revolution, the heads are then moved from the center 116 of the platen to the outside edge a short distance (e.g., one or more pixels). During a second revolution, the heads print dots in the space between the dots from the first revolution. The image resolution after two revolutions can therefore be increased to 200 dpi. By increasing the number of revolutions, the image resolution can correspondingly increase (e.g., to 300 dpi, 600 dpi, 1200 dpi, or greater). The heads can alternatively move from the outside edge toward the center of the platen.

This is similar to single pass printing, in which the nozzles from a plurality of printheads are interlaced to increase the resolution. In single pass printing, the number of heads must increase to increase the image resolution. However, with this printing system, the resolution can be increased without increasing the number of printheads, instead the resolution can increase by increasing the number of revolutions.

This process also applies to the printing system 400 of FIG. 5, which has rotating platens 402 on a moving conveyor 404.

Other implementations and combinations of these implementations are within the scope of the following claims. The platen can move the substrate along paths that are other than circular, for example, any non-straight path.

What is claimed is:

1. A printing system comprising:
a printhead for depositing droplets;
a platen configured to move a substrate along a non-straight path relative to the printhead, the printhead being positioned to deposit droplets of an image on the substrate as the substrate is moved along the non-straight path;
a key on the platen configured to store information about the substrate;
an imaging system; and
a reader configured to read the information about the substrate stored on the key and to send the information about the substrate to the imaging system;
wherein the imaging system is configured to format image data based on the non-straight path of the substrate, information about the substrate stored on the key, or both, and to send instructions to the printhead to deposit droplets on the substrate based on the formatted image data.

2. The printing system of claim 1, wherein the imaging system is further configured to adjust the printing system based on information about the substrate stored on the key.

3. The printing system of claim 2, wherein adjusting the printing system comprises adjusting a printhead stand-off distance between the printhead and the platen.

4. The printing system of claim 1, wherein the platen includes a cavity to hold the substrate.

5. The printing system of claim 1, wherein the key comprises a barcode.

6. The printing system of claim 1, wherein the key comprises an RFID tag.

7. The printing system of claim 1, wherein the information comprises set-up parameters for the printing system.

8. The printing system of claim 1, wherein the information comprises what type of substrate is supported by the platen.

9. The printing system of claim 1, wherein the platen is removable.

10. The printing system of claim 1, wherein the imaging system is configured to store a home position, which is a predetermined distance between the printhead and the platen.

11. The printing system of claim 1, wherein the platen is made of a moldable material that conforms to a shape of the substrate.

12. The printing system of claim 1, wherein the platen supports a plurality of substrates.

13. A printing system comprising:
a printhead for depositing droplets;
a plurality of platens coupled to a conveyor, the conveyor is configured to move along a straight path while the platens are configured to move along non-straight paths relative to the printhead, the printhead configured to deposit droplets of an image on a substrate supported by one of the platens as the substrate is moved along the non-straight path; and
an imaging system configured to format image data to account for the non-straight path of the substrate and to send instructions to the printhead to deposit droplets on the substrate based on the formatted image data;
a key on one of the plurality of platens, the key being configured to store information about the substrate; and
a reader configured to read the information about the substrate stored on the key and to send the information about the substrate to the imaging system;
wherein the imaging system is configured to format the image data based on the non-straight path of the substrate, information about the substrate stored on the key, or both, and to send instructions to the printhead to deposit droplets on the substrate based on the formatted image data.

14. The printing system of claim 13, wherein the non-straight path of at least one of the platens comprises a circular path about an axis of rotation of the platen.

15. The printing system of claim 13, wherein the conveyor moves relative to the printhead in a single pass printing configuration.

16. A method of printing, comprising:
rotating a substrate on a platen about an axis in a circular motion for at least one revolution;
formatting image data comprising applying an arc process to the image data to account for the circular motion of the substrate; and
using a printhead to deposit droplets in a direction parallel to the axis of rotation to print an image on the substrate based on the formatted image data; and
reading information about the substrate from a key on the platen and sending the information to an imaging system.

17. The method of claim 16, wherein formatting the image data further comprises separating the image data into cyan, magenta, yellow, and black.

18. The method of claim 17, further comprising sending the formatted image data to the printhead.

19. The method of claim 16, wherein formatting the image data further comprises applying a gradient mask process.

20. The method of claim 16, further comprising sensing the substrate in the platen and causing the printhead to deposit droplets when the substrate is sensed.

21. The method of claim 16, further comprising adjusting at least one of: the printhead, the platen, or the image data, based on the information read from the key.

22. The method of claim 16, wherein the image is comprised of dots and has a certain image resolution after one revolution, and the method further comprises increasing an image resolution by moving the printhead relative to the platen and printing dots in a space between the dots after the first revolution.

23. The printing system of claim 16, wherein the key comprises a barcode or a RFID tag.

24. The method of claim 16, wherein the key comprises a barcode or a RFID tag.

25. The method of claim 16, further comprising adjusting the printing system based on the information about the substrate read from the key on the platen.

\* \* \* \* \*

UNITED STATES PATENT AND TRADEMARK OFFICE
CERTIFICATE OF CORRECTION

| | | |
|---|---|---|
| PATENT NO. | : 9,004,624 B2 | Page 1 of 1 |
| APPLICATION NO. | : 13/112304 | |
| DATED | : April 14, 2015 | |
| INVENTOR(S) | : Richard J. Baker and Edward T. Chrusciel | |

It is certified that error appears in the above-identified patent and that said Letters Patent is hereby corrected as shown below:

On the title page under (*) Notice, after "Subject to any disclaimer, the term of this patent is extended or adjusted under 35 U.S.C. 154(b) by 475 days.", please insert -- This patent is subject to a terminal disclaimer. --

In the claims

Column 7, Line 15, please replace "system" with -- method --

Signed and Sealed this
Third Day of November, 2015

Michelle K. Lee
*Director of the United States Patent and Trademark Office*